United States Patent [19]

Ono et al.

[11] Patent Number: 5,943,068
[45] Date of Patent: Aug. 24, 1999

[54] PRINTER, FACSIMILE APPARATUS USING PRINTER AND IMAGE PROCESSING APPARATUS

[75] Inventors: Takeshi Ono, Kawasaki; Teruyuki Nishii, Tokyo, both of Japan

[73] Assignee: Canon Kabushiki Kaisha, Tokyo, Japan

[21] Appl. No.: 08/610,411

[22] Filed: Mar. 4, 1996

[51] Int. Cl.[6] .............................. H04N 1/034; H04N 1/21; B41J 29/38

[52] U.S. Cl. .................................... 347/3; 347/9; 358/298

[58] Field of Search ............................. 347/3, 9; 346/75; 358/298, 296, 530, 534, 80

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,708,463 | 1/1998 | Hirabayashi et al. | 347/43 |

FOREIGN PATENT DOCUMENTS

| | | |
|---|---|---|
| 0632405 | 1/1995 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 60-107975 | 6/1985 | Japan . |
| 7-52465 | 2/1995 | Japan . |

*Primary Examiner*—Edward H. Tso
*Assistant Examiner*—Rajnikant B. Patel
*Attorney, Agent, or Firm*—Fitzpatrick, Cella, Harper & Scinto

[57] ABSTRACT

A printing apparatus capable of printing in an appropriate print mode, for a short print period, with maintaining excellent image quality, and a facsimile apparatus or image processing apparatus using the printing apparatus. The type of the image data is examined, in accordance with the source of input image data, and main controller 1 instructs print controller 8 to perform printing in multipath print mode or in normal print mode, in accordance with the image type. The print controller 8 controls printhead 9 in accordance with the instruction. For example, a high-precision image or halftone image is printed in the multipath print mode, while a low-density image or binary image is printed in the normal print mode.

35 Claims, 12 Drawing Sheets

PRINTER, FACSIMILE APPARATUS USING PRINTER AND IMAGE PROCESSING APPARATUS

BACKGROUND OF THE INVENTION

This invention relates to a printing apparatus, a facsimile apparatus and/or an image processing apparatus using the printing apparatus and, more particularly to a printer which performs printing by scanning its printhead plural times, a facsimile apparatus and/or an image processing apparatus using the printing apparatus.

Conventional printers and facsimile apparatuses using a printer do not comprise a function for switching normal printing to multipath printing (printing by scanning a printhead plural times at the same scan area) or vice versa, in the middle of printing, in the middle of printing for one page, or in the middle of communication.

Further, there has been no device that automatically switches normal printing to multipath printing or vice versa in accordance with set operation mode, the type of output image, transfer speed of print data or time for decoding.

Furthermore, there has been no device that inputs from an operation panel the number of scanning operations of multipath printing.

Regarding multipath printing, Japanese Patent Application Laid-Open No. 60-107975 proposes a method for this type of printing. Further, European Patent Application No. 632405 A2 and Japanese Patent Application Laid-Open No. 7-52465 propose advanced multipath printing. European Patent Application No. 632405 A2 proposes print control to switch over of multipath printing to normal printing or vice versa.

However, in a serial printer using the conventional multipath printing method, printed results have stripe-like undesirable density unevenness at boundaries between scanned print areas, or different printing characteristic of each dot printed by the printhead becomes apparent to human eyes for each scan period, which causes degradation of image equality. Accordingly, a print range printed by one scanning is divided into a plurality of print areas, and each print area is scanned plural times, then the nozzles of the printhead are selected at random at each scanning, thus reducing the conspicuous striped density unevenness at boundaries between scanned print areas and density unevenness due to the characteristics of the respective nozzles, to prevent the degradation of image quality.

Next, the conventional multipath printing method will be briefly described.

FIG. 9 is a perspective view showing the structure of an ink-jet printer IJRA according to a typical conventional ink-jet printing method. In FIG. 9, a head carriage (HC) 5014 is engaged with a spiral groove 5004 of a lead screw 5005 which rotates via drive force transmission gears 5009 to 5011 interlocking with forward/reverse rotation of a carriage (CR) motor 5013. The head carriage 5014 reciprocally moves in directions represented by arrows a and b. The carriage 5014 has an ink-jet cartridge (IJC) 400. A paper holding plate 5002 presses a print sheet P against a platen 5000 along the moving direction of the carriage. Photosensors 5007 and 5008 are home position detectors for confirming the existence of lever 5006 of the carriage in this area and changing the rotational direction of the motor 5013. A support member 5016 supports a cap member 5022 for capping the front surface of the printhead (IJH) 5012. A suction member 5015 performs suction-restoration of the printhead via a cap inner opening 5023 by sucking the inside of the cap member 5022. Member 5019 allows a cleaning blade 5017 to move. A main body support plate 5018 supports the member 5019 and the cleaning blade 5017. A lever 5021 is for starting the sucking operation. It moves with a cam 5020 engaged with the carriage. The ink-jet cartridge 400 constituted with an ink tank (IT) 5001 and the ink-jet head (IJC) 5012 is supported by the carriage home-position detectors, a guide rail 5003 and an electrical connection point 5024, and is attached/detached to/from the head carriage 5014. A paper feed (PF) motor 5025 feeds the print sheet P.

FIG. 10 shows an example of a print model of two-scan multipath printing (two-path printing). For the purpose of simple explanation, a printhead employed here has eight ink nozzles for discharging ink. The nozzles are divided into two nozzle groups for four dots (four nozzles), and printing at one print area is made by respectively assigned nozzles. As a multimask pattern, a checker pattern for complementary ink-discharging is used, thus obtains constant printing density.

FIG. 11 shows an example of a print model of four-path printing. In this printing, the printhead nozzles are separated into four groups, and printing in one print area is made by four different nozzle groups. In FIG. 11, to perform printing at a print area 1, in a first scan, a mask pattern A1 is used; in a second scan, a mask pattern B1 is used; in a third scan, a mask pattern C1; and in a fourth scan, a mask pattern D1 is used. By the four mask patterns A1, B1, C1 and D1, printing in the print area 1 is 100% completed.

FIG. 12 is a block diagram showing the construction of a control circuit for controlling print data and multimask patterns. In FIG. 12, reference numeral 101 denotes a data register, connected to a memory data bus, for reading print data stored in a print buffer 130 in a memory and storing the read print data; 102, a parallel/serial converter for converting the print data in the data register 101 into serial data; 103, an AND gate for masking the serial data; 104, a counter for management of the number of data-transfer operations; 105, mask registers A to D, connected to a CPU 110, for storing mask patterns; 106, a selector for selecting a line position of a mask pattern in accordance with output from a column counter 111; and 107, a selector for management of digit positions.

In the control circuit, the print data is serial-transferred to the printhead in accordance with a print command signal from the CPU 110. That is, the print data stored in the print buffer 130 is temporarily stored in the data register 101, and converted by the parallel/serial converter 102 into serial data. Then, the serial data is masked by the AND gate 103, and transferred to the printhead. On the other hand, the transfer counter 104 counts the number of transfer-bits, and instructs the end of data transfer for one column.

The mask register 105 constituted with the four mask registers A, B, C and D holds mask patterns written by the CPU 110. The selector 107 selects mask pattern data corresponding to a line position based on the value of the transfer counter 104 as a selection signal. The mask pattern data selected by the selectors 106 and 107 is used for masking in the transfer data the AND gate 103.

However, in this conventional technique, assuming that the number of scan operations in multipath printing at one print area is n, print time is n times longer than normal printing. For the practical use, to perform printing such that density unevenness and stripes at boundaries between the print areas are inconspicuous, and to improve image quality, at least four scan operations are necessary. This results in print time four times longer than the normal printing.

Further, in the conventional printer, selection of normal printing/multipath printing is made by manual operation, and switch over of the print mode in the middle of printing or in the middle of printing for one page is not normally done. Furthermore, the selection of normal printing/multipath printing is not automatically performed in accordance with set mode of the printer or the type of print data. Accordingly, in a case where a part of an image to be printed or a part of an image received via communication is a halftone image in which boundaries between print areas will tend to be conspicuous, if the initial set mode is the normal print mode, the print mode is not switched to the multipath print mode. As a result, print image have conspicuous density unevenness and/or stripes at boundaries between print areas, thus the image quality is degraded.

On the other hand, if the initial set mode is the multipath print mode, even when print data is binary image data or very simple image data, where boundaries between print areas will be inconspicuous, the print time becomes long.

SUMMARY OF THE INVENTION

Accordingly, an object of the present invention is to provide a printing apparatus which automatically switches print mode even during printing operation in accordance with the content of image, thus maintains excellent image quality or attains high-speed printing.

According to one aspect of the present invention, the foregoing object is attained by providing a printing apparatus which performs printing by scanning a printhead a plural number of times over a print area of a print medium, in a direction perpendicular to a conveyance direction of the print medium, comprising: input means for inputting image data; judgment means for judging the type of the image data; selection means for selecting a first print mode for performing printing by scanning the printhead the plural number of times over the print area of the print medium, or selecting a second print mode for performing printing by scanning the printhead once over the print area, in accordance with the result of judgment by the judgment means; and print means for performing printing using the printhead in one of the first print mode and second print mode selected by the selection means.

In accordance with the printing apparatus as described above, the type of input image data is judged, then the first print mode to perform printing by scanning the printhead plural times at a print area of a print medium, or the second print mode to perform printing by scanning the printhead once over the print area, is selected in accordance with the judgment result, and printing is performed by using the printhead in the selected print mode.

It is another object of the present invention to provide a facsimile apparatus using the printing apparatus as described above.

According to another aspect of the present invention, the foregoing object is attained by providing a facsimile apparatus employing the printing apparatus claimed in claim 1, as a printing unit, comprising: communication means for performing facsimile communication with a communication destination apparatus via a communication line; coding and decoding means for encoding image data and decoding coded data received via the communication line; interpretation means for interpreting as to what function is available in the communication destination apparatus; and transmission control means for instructing the communication destination apparatus to perform printing in accordance with result of interpretation by the interpretation means, and for transmitting image data to the communication destination apparatus, wherein print control in the printing unit is performed in accordance with the result of interpretation by the interpretation means.

In accordance with the facsimile apparatus using the above printing apparatus as described above, the instructions indicating available functions of a communication destination apparatus received via the communication line are interpreted, then print instruction is sent to the communication destination apparatus and control is performed to transmit image data to the communication destination apparatus in accordance with the interpretation result, and print control is performed in accordance with the interpretation result.

It is still another aspect of the present invention to provide an image processing apparatus using the printing apparatus as described above as a printer unit.

According to still another aspect of the present invention, the foregoing object is attained by providing an image processing apparatus including printing means for performing multipath printing by repetitively scanning a printhead over a print area of a print medium, comprising: input means for inputting image data; image processing means for processing the image data inputted by the input means: judgment means for judging the type of the image data; selection means for selecting a first print mode for performing printing by scanning the printhead a plural number of times over the print area of the print medium, or selecting a second print mode for performing printing by scanning the printhead once over the print area, in accordance with the result of judgment by the judgment means; and print control means for performing printing using the printhead in one of the first print mode and second print mode selected by the selection means.

The present invention is particularly advantageous since printing in appropriate print mode can be performed in accordance with the type of image data, and images with excellent image quality can be obtained.

Also, in accordance with another aspect of the present invention, appropriate print instruction can be sent to a communication destination apparatus in accordance with the type of transmission image data, and appropriate printing to reduce print-time loss to a minimum level in accordance with the type of received image data and to obtain images with excellent image quality can be performed.

Further, in accordance with still another aspect of the present invention, even if image data for one page has a binary image and a halftone image area, the types of these areas are respectively judged, and the first or second print mode is selected in accordance with result of judgment. Thus, print-time loss can be reduced to a minimum level even if a one-page image has a plural types of image areas, and images with excellent image quality can be obtained.

Further, in accordance with still another aspect of the present invention, the print mode can be selected by manual operation. Thus, an appropriate printing in image quality and/or print speed can be made, in accordance with a user's convenience.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[Embodiment]

Figure 1:
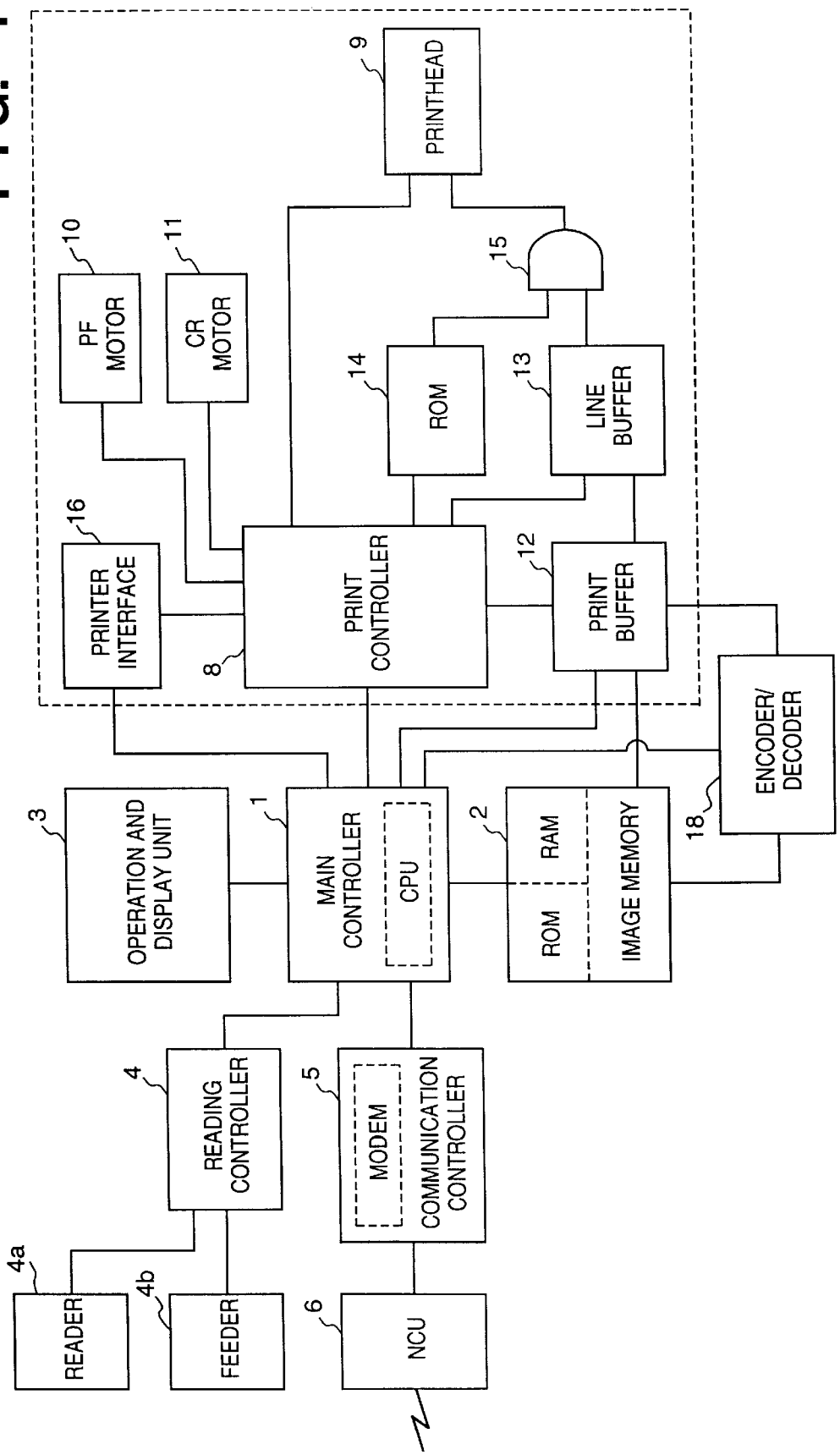
FIG. 1 is a block diagram showing the construction of a facsimile apparatus as a typical embodiment of the present invention.

FIG. 1 shows the construction of a G3 facsimile apparatus having a printer unit which performs printing by using an ink-jet printhead, as a typical embodiment of the present invention. This facsimile apparatus has, as print modes, normal print mode and multipath print mode. The facsimile apparatus operates as a copying apparatus and if connected to an external device, operates as a printing apparatus, in addition to fulfilling the facsimile function.

In FIG. 1, numeral 1 denotes a main controller comprising a CPU for controlling the operation of the apparatus or the like; 2, an image memory comprising a ROM, a RAM and the like; 3, a operation and display unit having an LCD, LED's and the like, and key switches for inputting various instructions to the apparatus; and 4, a reading controller for controlling a reader 4a comprising a CCD, a CS (color scanner) or the like for reading original images, and a feeder 4b for sequentially feeding the original document to the reader 4a. When the apparatus transmits image data or performs copying, image data read by the reader 4a and processed by the reading controller 4 is stored into the image memory 2.

Numeral 5 denotes a communication controller comprising a modem and the like; 6, an NCU; and 7, a communication line. Upon facsimile transmission, read image data is transmitted via the communication controller 5, the NCU 6 and the communication line 7; on the other hand, upon facsimile reception, image data is stored into the image memory 2 via the communication line 7, the NCU 6 and the communication controller 5.

Numeral 8 denotes a print controller which controls a printhead 9, a paper-feed (PF) motor 10 for feeding print sheets, a carriage (CR) motor 11 for reciprocate-scanning the printhead 9 in a predetermined direction (main-scanning direction); 12, a print buffer for temporarily storing image data read for image printing, image data obtained by decoding received coded data or image data inputted from an external device.

Numeral 13 denotes a line buffer for storing image data for one or two scan operations in correspondence with the number of dots (number of nozzles) of the printhead 9 according to an ink-jet printing method, to enable continuous printing by one-scan operation while data is accumulated into the print buffer 12. Upon printing, parallel-serial converted image data is transferred from the line buffer 13 to the printhead 9. An AND gate 15 for logical AND operation of the mask pattern data stored in the ROM 14 and the image data is provided between the printhead 9 and the line buffer 13. When the multipath printing is selected, the mask pattern data is transferred under the control of the print controller 8. Note that in the normal printing, the print controller 8 perform control such that the output from the ROM 14 is a high-level (H) signal regardless of whatever the mask pattern data is.

Numeral 16 denotes a printer interface, according to RS232C or centronics standards or the like, comprising a connector, a buffer and the like, for receiving image data transmitted from an external device (e.g., a host computer) via an interface cable; and 18, an encoder/decoder which serially decodes received coded data stored in the image memory 2, outputs the decoded data in the form of image data to the print buffer 12, detects a line-synchronization code (EOL: End of Line) for each line, or encodes image data of an original image read by the reader 4a and outputs the coded data to the image memory 2 for facsimile transmission.

In the above construction, a portion surrounded by a broken line operates as a printer unit.

Figure 2:
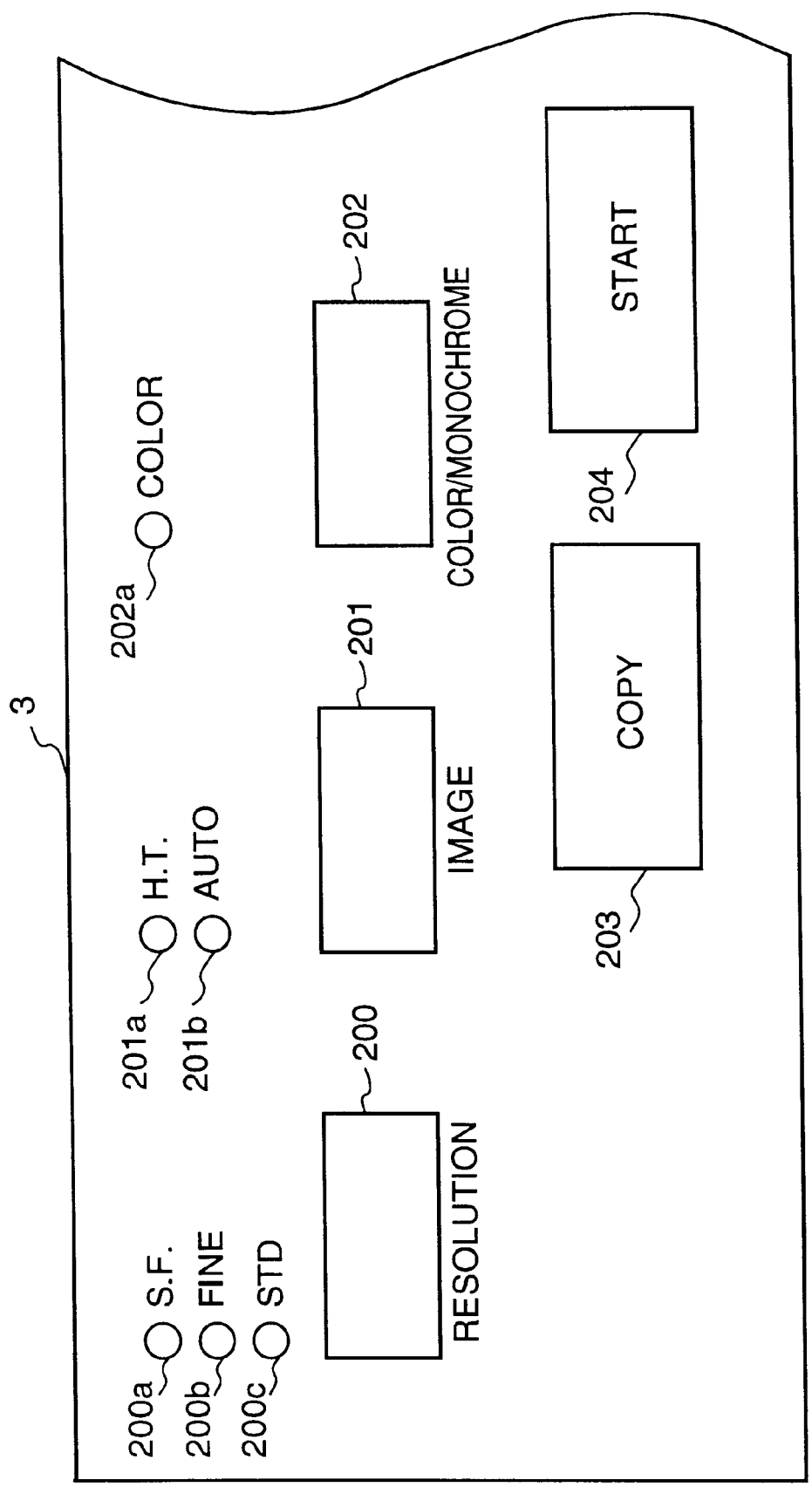
FIG. 2 is an example of layout of an operation and display unit 3 of the facsimile apparatus in FIG. 1.

FIG. 2 shows detailed layout of a part of the operation and display unit 3 according to the embodiment. In FIG. 2, numeral 200 denotes a RESOLUTION key for changing print-line density; 201, an IMAGE key for selecting print image type (binary image mode, halftone image (HT) mode and automatic selection (AUTO) mode); and 202, a COLOR/MONOCHROME key for selecting color mode or monochrome mode (normal monochrome mode). Numerals 200a to 200c denote LED's for indicating the set print-line density. When the LED 200a is turned on, the set printing density is super-fine (S.F.) mode of 15.4 lines/mm in a subscanning direction; when the LED 200b is turned on, the set printing density is fine (Fine) mode of 7.7 lines/mm in the subscanning direction; when the LED 200c is turned on, the set printing density is standard (STD) mode of 3.85 lines/mm in the subscanning direction. The print mode is cyclically changed by pressing the RESOLUTION key 200.

Numeral 201a denotes an LED which indicates the selection of the halftone mode where dither processing or error-diffusion processing is performed to represent halftone images; and 201b, an LED which indicates the selection of the AUTO mode to represent images as the mixture of halftone and binary images. when both of the LED's 201a and 201b are turned off, normal binary image mode is selected. Numeral 202a denotes an LED which is turned on when the color image reading is selected. When the LED 202a is turned off, the normal monochrome image reading is selected.

Numeral 203 denotes a COPY key for instruction of copying operation in accordance with the mode selected by the keys 200 to 202; and 204, a START key for starting image reading in accordance with the mode selected by the keys 200 to 203 and starting facsimile transmission. Note that the operation and display unit 3 further has an LCD for indicating the apparatus status, time, a communication destination and the like, ten keys for inputting dial-numbers of communication destinations upon facsimile transmission, and the like.

Accordingly, the printer unit of the facsimile apparatus having the above construction operates to perform printing when: (1) original image(s) is read from the reader 4a for copying (copying operation); (2) facsimile image(s) received via the communication line 7 is outputted (facsimile operation); and (3) image data received via the printer interface 16 is outputted (printer operation).

Figure 3:
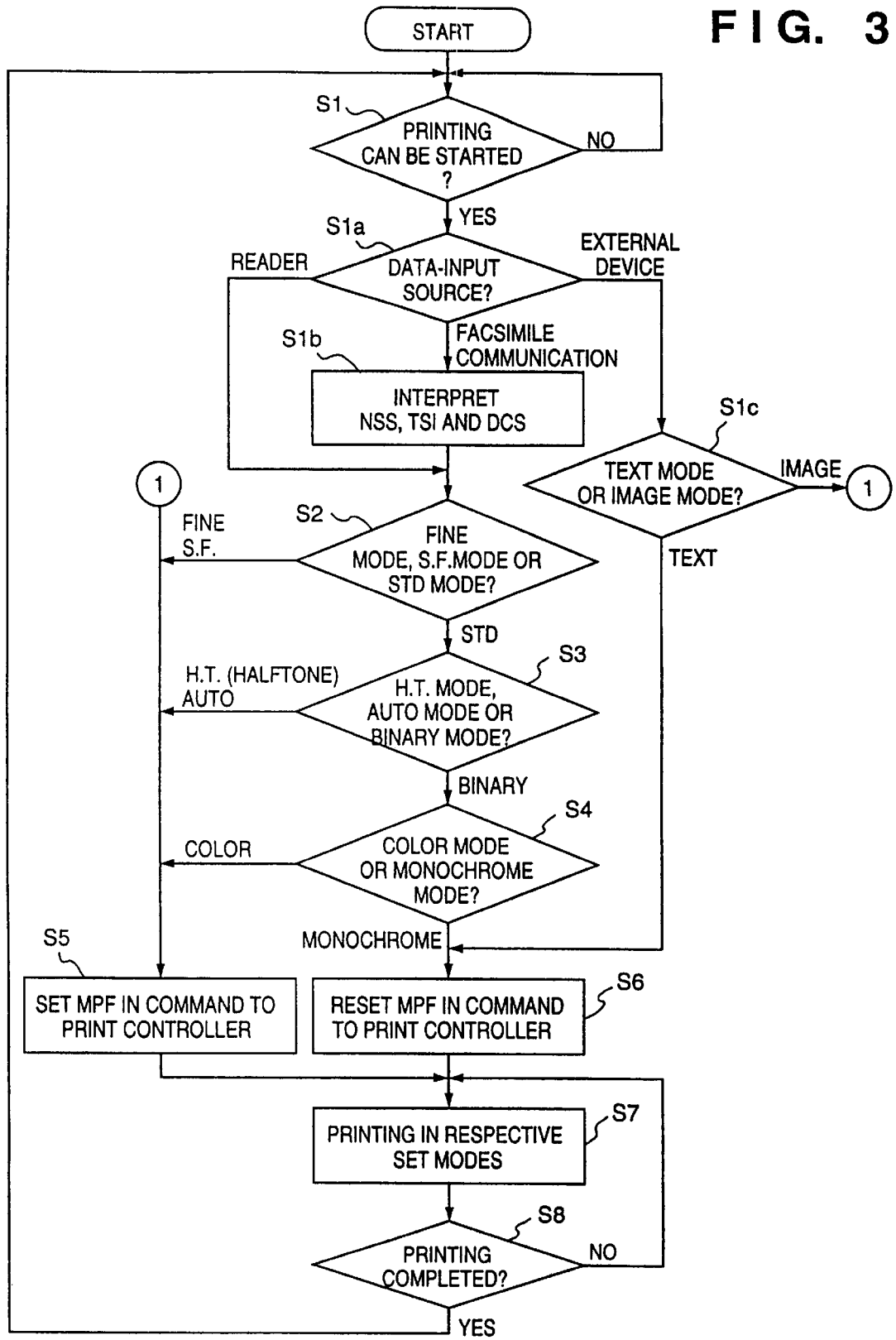
FIG. 3 is a flowchart showing three printing operations.

Next, the printing operation of the printer unit in these three cases will be described in detail with reference the flowchart of FIG. 3.

At step S1, whether or not printing operation can be started is determined. In this explanation, the printing operation is the copying of original image(s) read from the reader 4a, copying of image data temporarily stored in the image memory 2, image-output based on received facsimile data, print-output of image data transmitted from an external device or the like. If YES, i.e., it is determined that the printing operation can be started, the process proceeds to step S1a, at which a data-input source is examined.

If the data-input source is the reader 4a (copying operation), the process proceeds to step S2 to examine a set print-line density. If the data-input source is the facsimile apparatus connected via the communication line 7 (facsimile operation), the process proceeds to step S1b, at which NSS, TSI and DCS signals are interpreted to examine the print-control contents, thereafter, proceeds to step S2. If the data-input source is the external device connected via the printer interface 16 (printer operation), the process proceeds to step S1c, at which whether the received data is for text (TEXT) mode using character codes or image mode using graphic data is examined. If the data is for the TEXT mode, the process proceeds to step S6, while if the data is for image mode, the process proceeds to step S5.

That is, in a case where the present apparatus operates as a printer, if the data to be outputted is for the TEXT mode using character codes, since stripe-like density unevenness at boundaries between print areas by scanning of the print-head does not occur, the multipath printing is not necessary. On the other hand, if the data is for image mode sending graphic data following predetermined printer-control codes, the multipath printing is effective to render boundaries between print areas inconspicuous.

At step S2, the set print-line density is examined. If the setting is the fine mode or super fine mode, the process proceeds to step S5 to select the multipath print mode as print mode.

If it is found at step S2 that the standard mode is set, the process proceeds to step S3, at which the set image type is examined. If the setting is the halftone (HT) mode or the automatic selection (AUTO) mode, the process proceeds to step S5 to select the multipath print mode as print mode. If it is found at step S2 that the binary image mode is set, the process proceeds to step S4, at which whether the color mode or monochrome mode is selected is determined. If the color mode is selected, the process proceeds to step S5 to select the multipath print mode as print mode.

On the other hand, if the monochrome mode is selected at step S4, the process proceeds to step S6 to select the normal print mode.

At step S5, a print command, where a multipath flag (MPF) instructing to perform the multipath printing is set, is outputted from the main controller 1 to the print controller 8. At step S6, a print command, where the multipath flag MPF is reset, i.e., instructing to perform the normal printing, is outputted form the main controller 1 to the print controller 8.

In the present embodiment, the print mode is selected on the premise that when a user selects a high-density print mode, image data is usually of high-precision image(s), and in this mode, reading time, longer than that in other reading modes, offsets print time for the multipath printing. Accordingly, if the set print-line density is the super-fine mode or fine mode, the multipath print mode is selected. Also, when the user selects the halftone image (HT) mode or the automatic selection (AUTO) mode, the image data may be of halftone image(s) where density unevenness or stripe-like density unevenness at boundaries between print areas are conspicuous, the multipath print mode is selected.

However, the description of the above control shows merely one example, and various arrangement may be added to the present embodiment. For example, the print mode may be set to the multipath print mode regardless of a set print-line density, otherwise, the print mode may be set to the multipath print mode only when the super-fine mode is selected. Further, in a case where the print mode is set to the multipath print mode regardless of the print-line density, the number of scannings may be changed in correspondence with the super-fine/fine/standard mode.

This may also be applied to the selection of print mode in accordance with the type of output image. The selection of print mode and the number of scannings of multipath printing is not limited to the present embodiment.

In addition, it is possible to set such that multipath print mode is selected only when two or more conditions are satisfied, e.g. only when the color mode and the halftone image mode are selected, otherwise the halftone image mode and the super-fine mode are selected. Further, the number of multipath scannings may be increased as the number of conditions increases.

At step S7, the printer unit performs printing operation in the selected print mode, and at step S8, if it is determined that the printing operation has been completed, the process returns to step S1.

Note that in the present embodiment, in the copying and facsimile operations, the multipath printing mode is selected on the same conditions, however, the conditions may be changed in accordance with the in the copying/facsimile operation. For example, in the copying operation, it is considered that the user is near the apparatus. Thus, if the user is conscious of the printing speed, to increase print speed, the normal printing mode may be selected.

Figure 4:
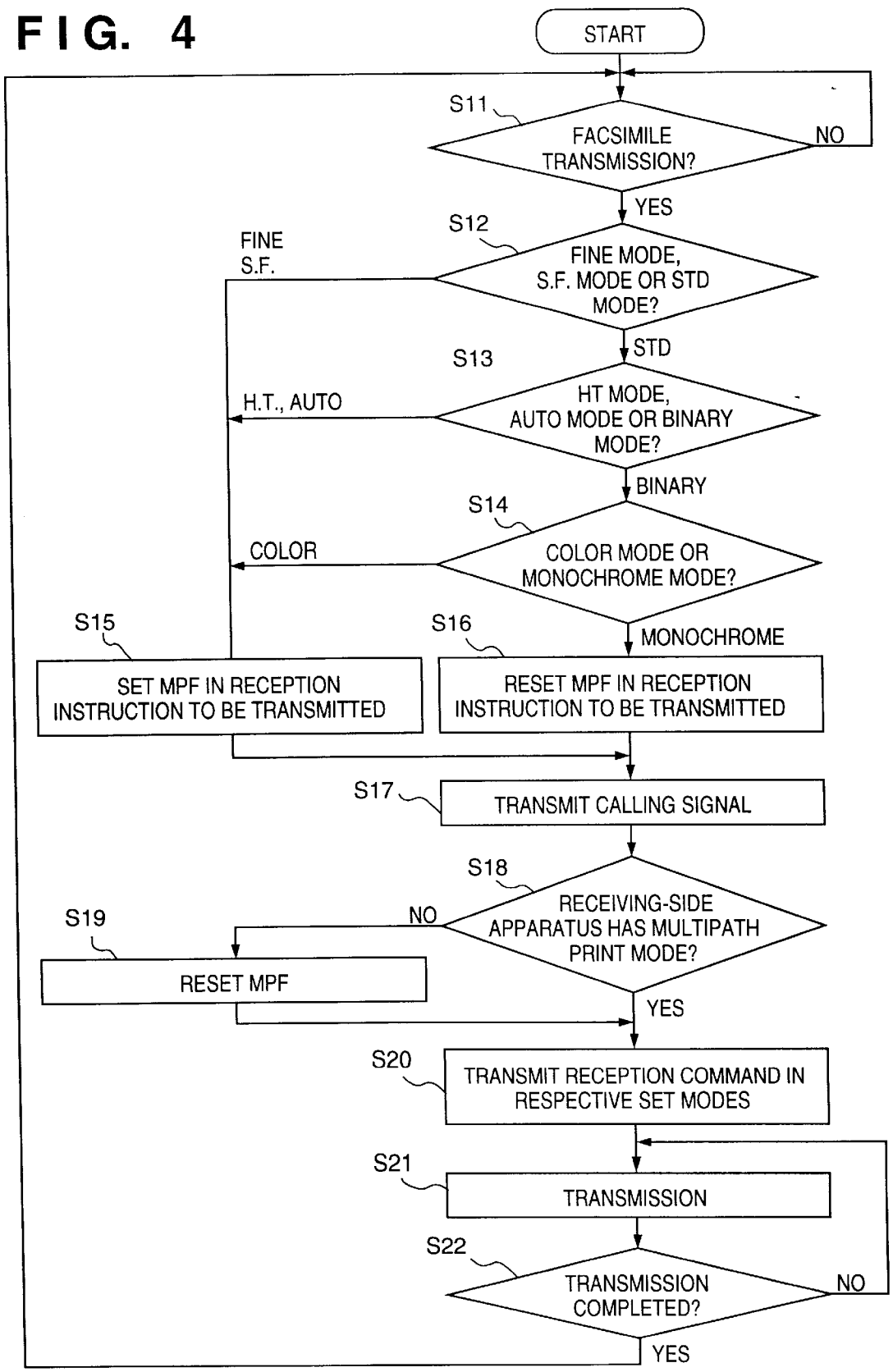
FIG. 4 is a flowchart showing operation of the facsimile apparatus when it operates as a transmitting-side apparatus in facsimile communication.

Next, the operation of the present apparatus as a transmitting-side apparatus in facsimile communication will be described with reference to the flowchart of FIG. 4 and the timing chart of FIG. 5.

In the transmitting-side apparatus, original image(s) is read in a reading mode set from the operation and display unit 3, whether or not the multipath printing mode is selected is determined in accordance with the set reading mode, and if it is determined that the multipath printing mode is selected, and a reception instruction signal including a multipath print command where the multipath flag (MPF) is set is transmitted to the receiving-side apparatus. In the receiving-side apparatus, whether or not the apparatus has multipath print mode is informed to the transmitting-side apparatus, and whether or not the multipath printing is performed in accordance with the instruction from the transmitting-side apparatus is determined.

At step S11, whether or not facsimile-transmission is started is confirmed, then at step S12, the print-line density set for the transmission image is examined. At this time, if the setting is the super-fine (S.F.) mode or the fine (Fine) mode, the process proceeds to step S15, but if the setting is the standard (STD) mode, the process proceeds to step S13. At step S13, the set type of print image is examined. If the set image type is the halftone image (HT) mode or the automatic selection (AUTO) mode, the process proceeds to step S15, while if the set image type is the binary image mode, the process proceeds to step S14. At step S14, whether the color mode or the monochrome mode is set is examined. If the color mode is set, the process proceeds to step S15, while if the monochrome mode is set, the process proceeds to step S16.

At step S15, a print command, where the multipath flag (MPF) instructing to perform the multipath printing is set, is outputted from the main controller 1 to the communication controller 5, on the other hand, at step S16, a print command, where the multipath flag (MPF) is reset (i.e., instructing the normal print mode) is outputted from the main controller 1 to the communication controller 5.

Figure 5:
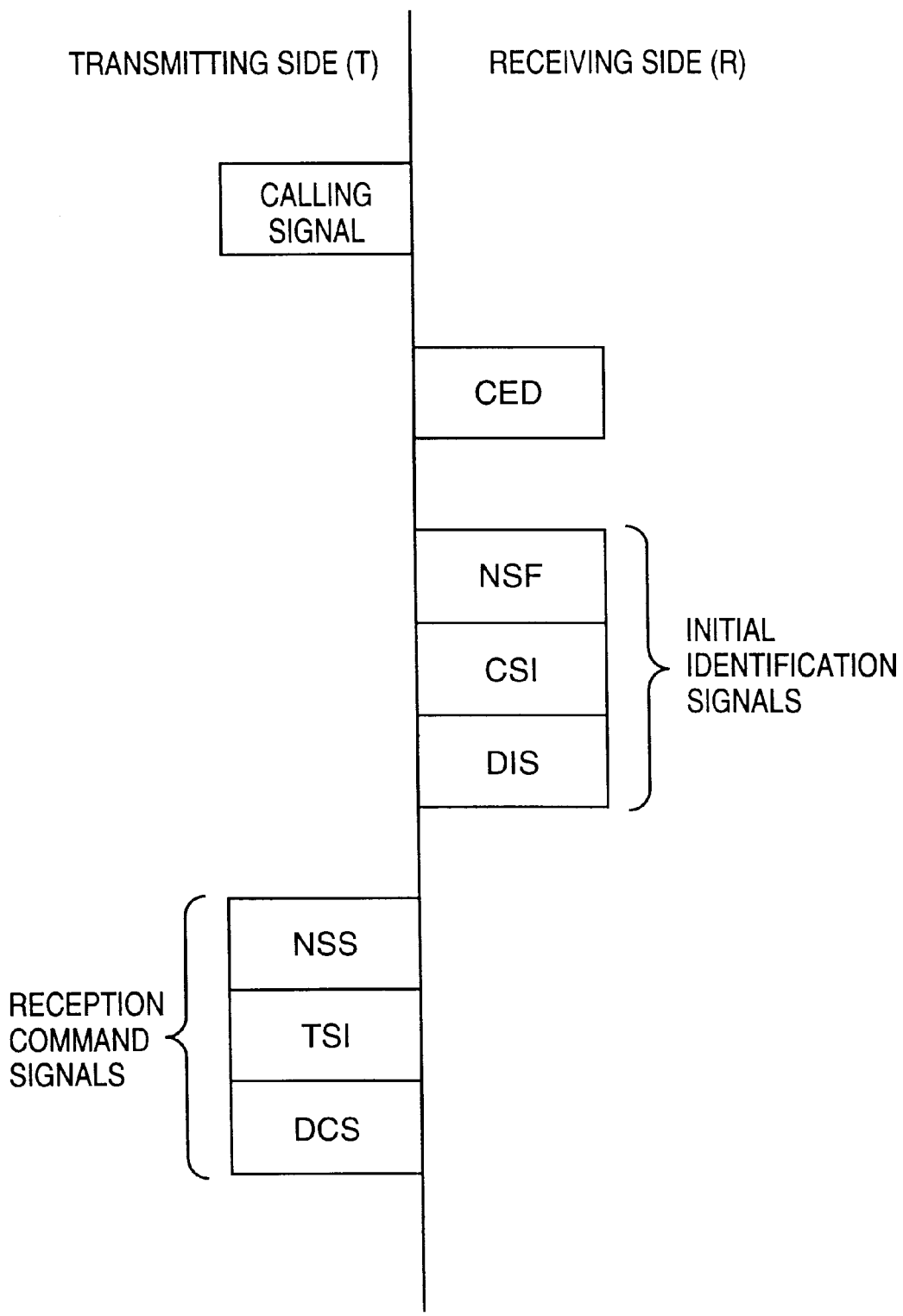
FIG. 5 is a timing chart showing timings of facsimile control signals transmitted between the transmitting-side apparatus and a receiving-side apparatus in the facsimile communication.

Next, at step S17, a calling signal is transmitted via the NCU 6 and the communication line 7 to the receiving-side apparatus as shown in FIG. 5. As shown in FIG. 5, after the transmitting-side apparatus has received a CED (called station identification) signal from the receiving-side apparatus, it receives initial identification signals (NSF, CSI and DIS signals in FIG. 5) and interprets the contents of the signals to determine whether or not the receiving-side apparatus has the multipath print mode. Note that the information on the print-line density is set in the DIS signal; information on functions other than those in the ITU Recommendations such as the HT/AUTO mode, the color/monochrome mode and the multipath/normal print (MPF) mode is set in the NSF signal as optional mode information. If it is confirmed that the receiving-side apparatus does not have the multipath print mode, the process proceeds to step S19, to reset the multipath flag MPF, then proceeds to step S20. On the other hand, if it is determined that the receiving-side apparatus has the multipath print mode, the process proceeds to step S20.

At step S20, reception-instructing signals (NSS, TSI and DCS signals in FIG. 5) are transmitted in accordance with the set mode. At step S21, the facsimile image signal is transmitted in the respective set modes, and at step S22, whether or not the transmission has been completed is determined. If YES, the process returns to step S11 to wait for the next transmission operation.

Note that as information to instruct the receiving-side apparatus to perform printing in the multipath print mode, the number of scannings in the multipath printing may be transmitted. For example, it can be arranged that if the number of scannings is "0", the normal printing instead of the multipath printing is instructed, while if the number of scannings is a positive integer other than "0", the multipath printing is instructed.

In addition to the above examples, the selection of multipath print mode may be performed only when two or more conditions such as the combination of color mode and the halftone image mode, or the combination of halftone image mode and the super-fine mode are satisfied. Further, the number of scannings of multipath printing may be increased as the number of these conditions increases. Furthermore, if a user in a transmitting-side wishes to limit the multipath printing in accordance with the operation condition(s) of a receiving-side apparatus, the existence/absence of instruction of multipath printing, the number of scannings, or the maximum number of scannings of multipath printing may be transmitted in optional mode information in the NSF signal.

Accordingly, in accordance with the present embodiment, as print mode is automatically selected in accordance with the type of image data and/or print-line density, printing appropriate to the image data can be performed with maintaining image quality and without lowering printing speed.

[Other Embodiments]

Figure 6:
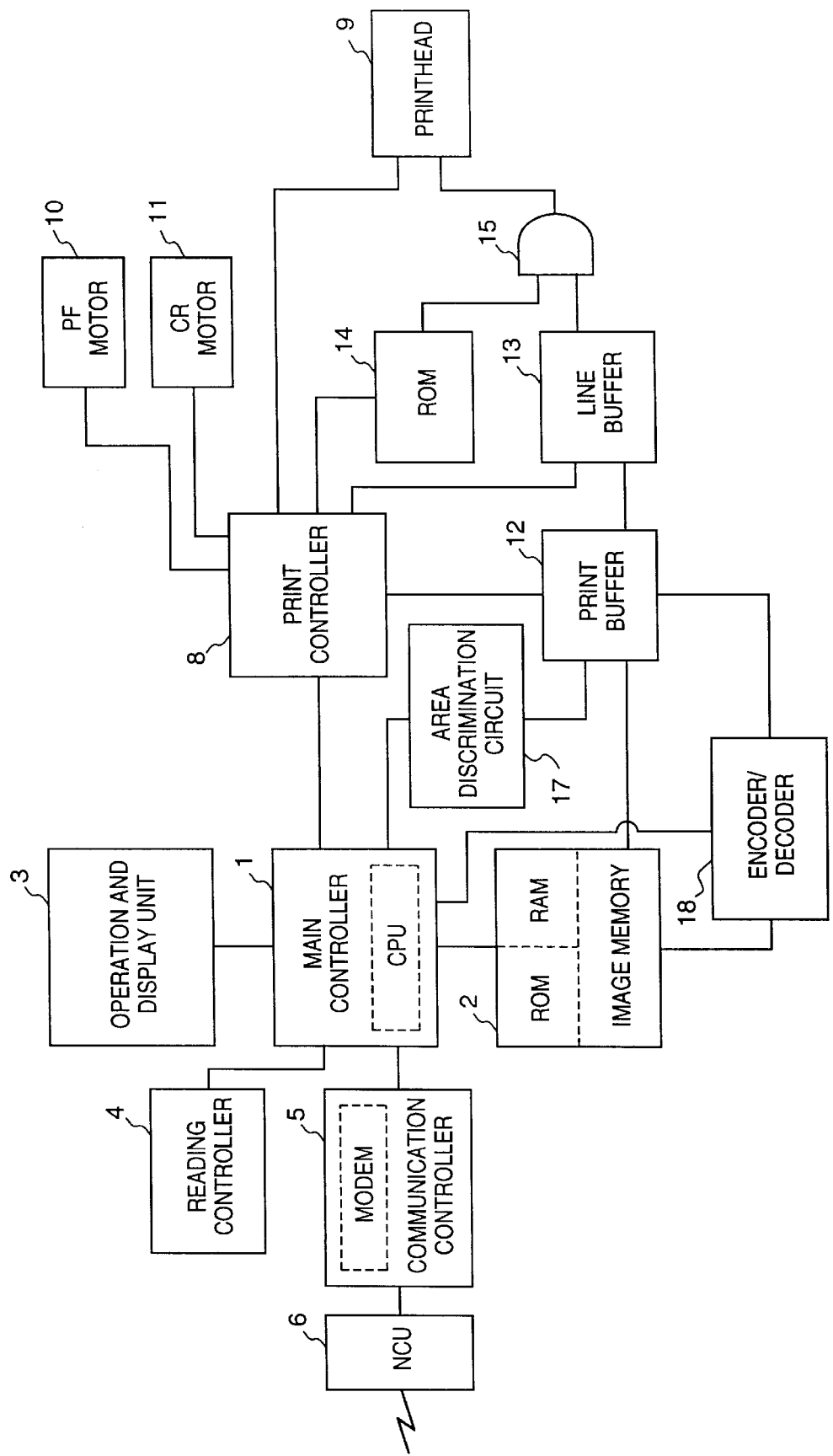
FIG. 6 is a block diagram showing the construction of the facsimile apparatus according to another embodiment of the present invention.

FIG. 6 shows the construction of the G3 standard facsimile apparatus having the printer unit which performs printing by using the ink-jet printhead according to another embodiment of the present invention. The construction of this apparatus is substantially identical to that of the facsimile apparatus in FIG. 1, therefore, the corresponding elements have the same reference numerals and the explanation of those elements will be omitted. In FIG. 6, numeral 17 denotes an area discrimination circuit which discriminates whether an area of image data in the print buffer 12 is indicative of a binary image or halftone image.

The area discrimination circuit 17 performs discrimination based on the distribution of black dots in an m×n dots (e.g., 5×9 dots); if the black dots are diffused, the area discrimination circuit 17 disciminates the image as a halftone image; while if the black dots are concentrated, it discriminates the image as a binary image. The main controller 1 selects the multipath print mode in a halftone image area, and selects the normal print mode in a binary image area, based on the discrimination results from the area discrimination circuit 17. Further, in case of halftone image data, the main controller 1 varies the number of scannings of multipath printing in accordance with the degree of diffusion of black dots in the image data.

In a case where the switch over of multipath/normal print mode is made by print scanning of the printhead 9, the print buffer 12 is divided into a plurality of storage areas in correspondence with the number of scan lines, and the area discrimination is performed by the divided area.

Accordingly, in this embodiment, if image data for one page contains binary image data and halftone image data, the switching of normal/multipath printing is performed even printing is in the middle of the page.

Otherwise, a reference area for area discrimination may be enlarged and the print mode selection may be performed by page; e.g., if a halftone image area is larger than a binary image area in one page, the multipath print mode is selected, and if a binary image area is larger than a halftone image area in another page, the normal print mode is selected.

Figure 7:
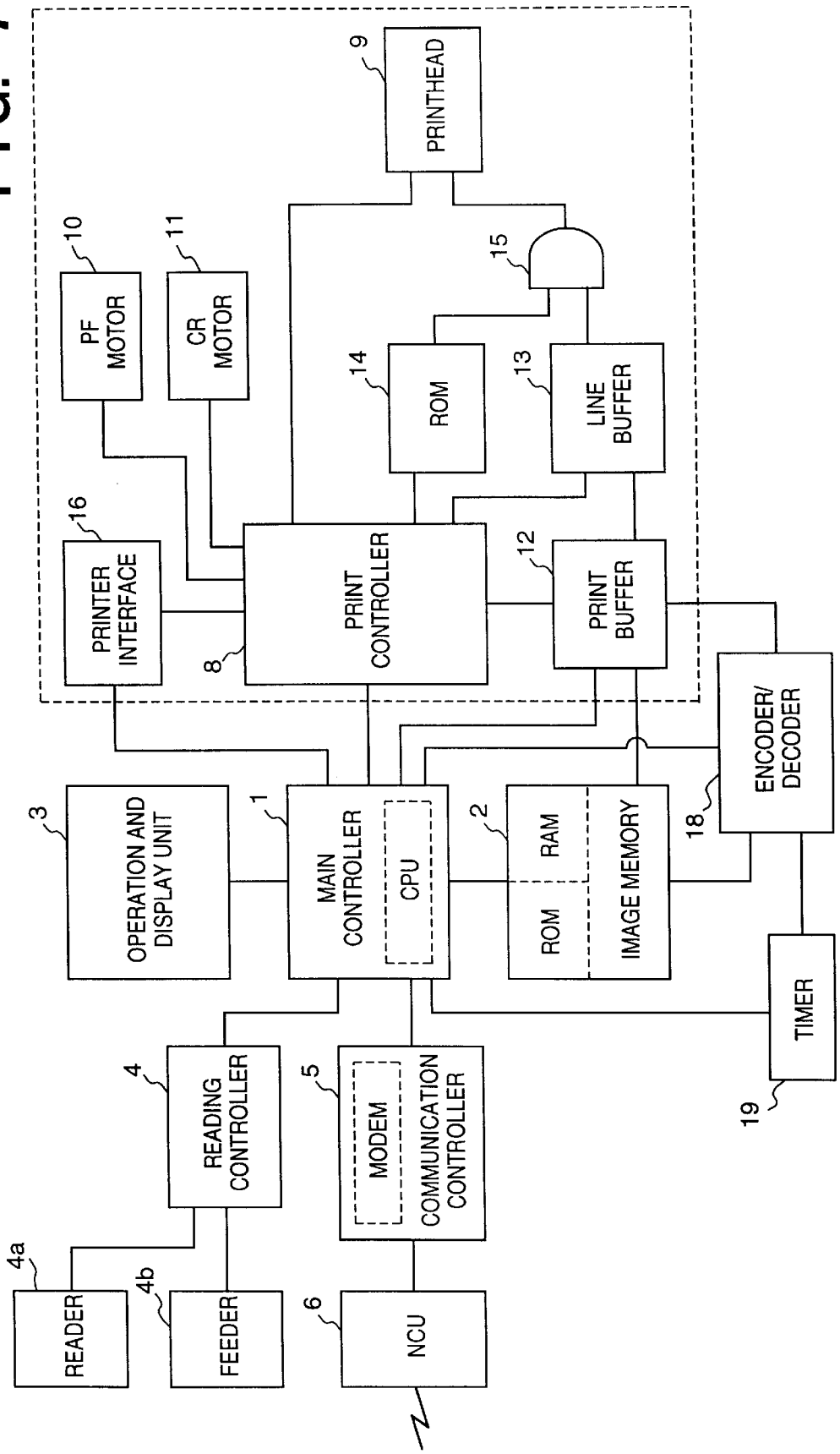
FIG. 7 is a block diagram showing the construction of the facsimile apparatus according to still another embodiment of the present invention.

FIG. 7 shows the construction of the G3 standard facsimile apparatus having the printer unit which performs printing by using the ink-jet printhead according to another embodiment of the present invention. The construction of this apparatus is substantially identical to that of the facsimile apparatus in FIG. 1, therefore, the corresponding elements have the same reference numerals and the explanation of those elements will be omitted. In FIG. 7, numeral 19 denotes a timer which measures time required for decoding image data for one line or time for transmitting the coded image signal, including decoding time, by counting the intervals between the EOL signals.

In this embodiment, the main controller 1 examines processing time for one line, and if the processing time is equal to or longer than a predetermined period, it judges the image data as high-precision or halftone image data and selects the multipath print mode; while if the processing time is shorter than the predetermined period, it judges the image data as binary image data and selects the normal print mode.

According to the embodiment, if image data received via facsimile transmission for one page contains binary image data and halftone image data, the normal/multipath print mode can be automatically switched to the other print mode in accordance with the processing time for decoding each line, even in printing is in the middle of the page.

Regarding the decoded image data, the number of inversions of white pixel to black pixel and that of inversions of black pixel to white pixel may be counted. If the count value is equal to or greater than a predetermined value, it is judged that the image data is indicative of high-precision or halftone image. As described above, it is considered that the multipath printing renders stripe-like density unevenness, which might appear in boundaries between print areas, inconspicuous, and long data processing time is offset by the long reading time. Therefore, if the image data is judged as halftone image data, the multipath print mode is selected. On the other hand, if the count value of the black/white pixel inversions is smaller than the predetermined value, it is judged that the image data is indicative of a binary image and the normal print mode is selected. This avoid printing for unnecessarily long print time by inappropriate printing. Note that the number of white/black pixel inversions may be judged at a plurality of levels, and the number of scannings of multipath printing may be increased as the number of white/black pixel inversions increases.

Figure 8:
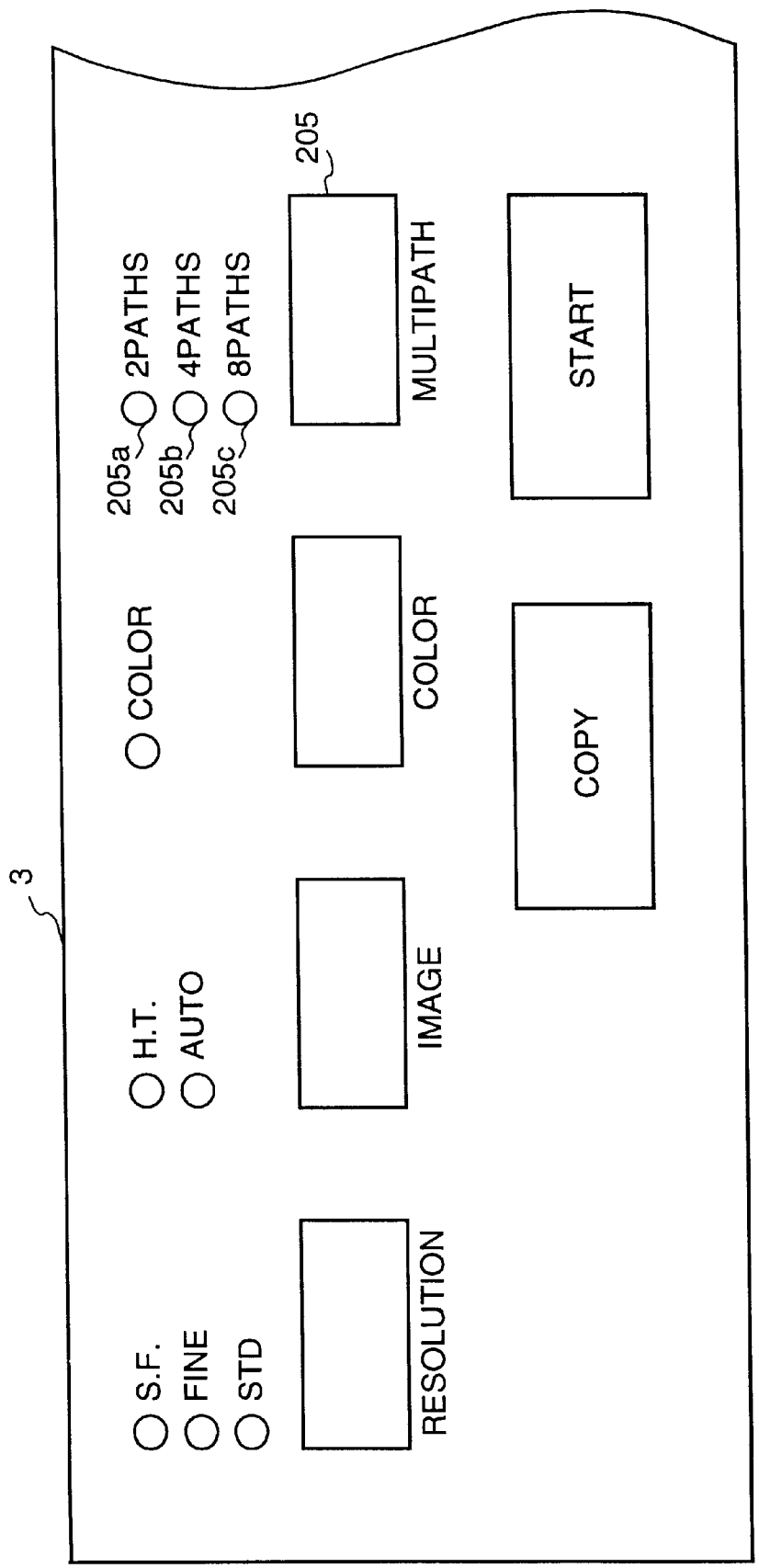
FIG. 8 is another example of layout of the operation and display unit 3 of the facsimile apparatus.
Figure 9:
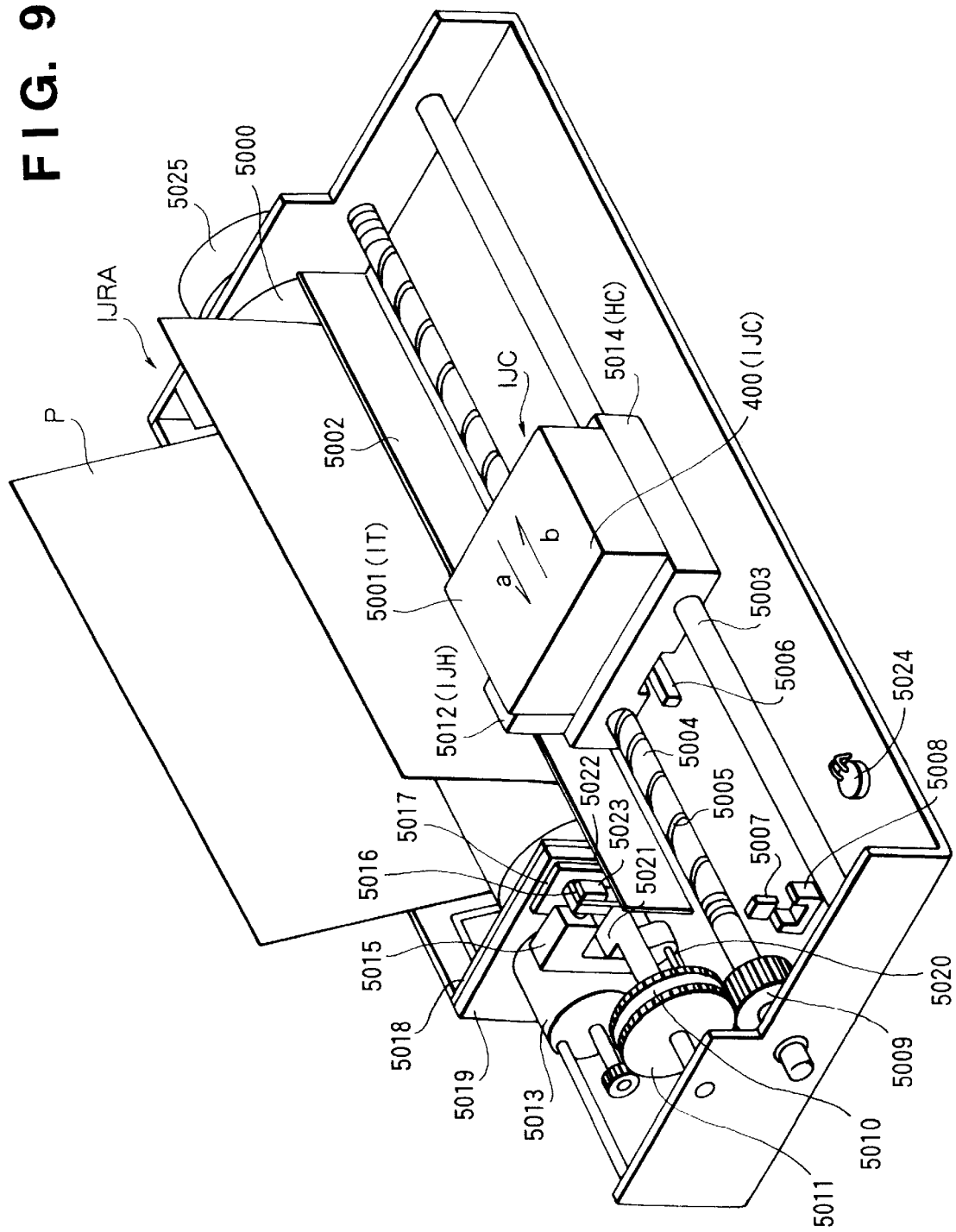
FIG. 9 is a perspective view showing the construction of a conventional printer.
Figure 10:
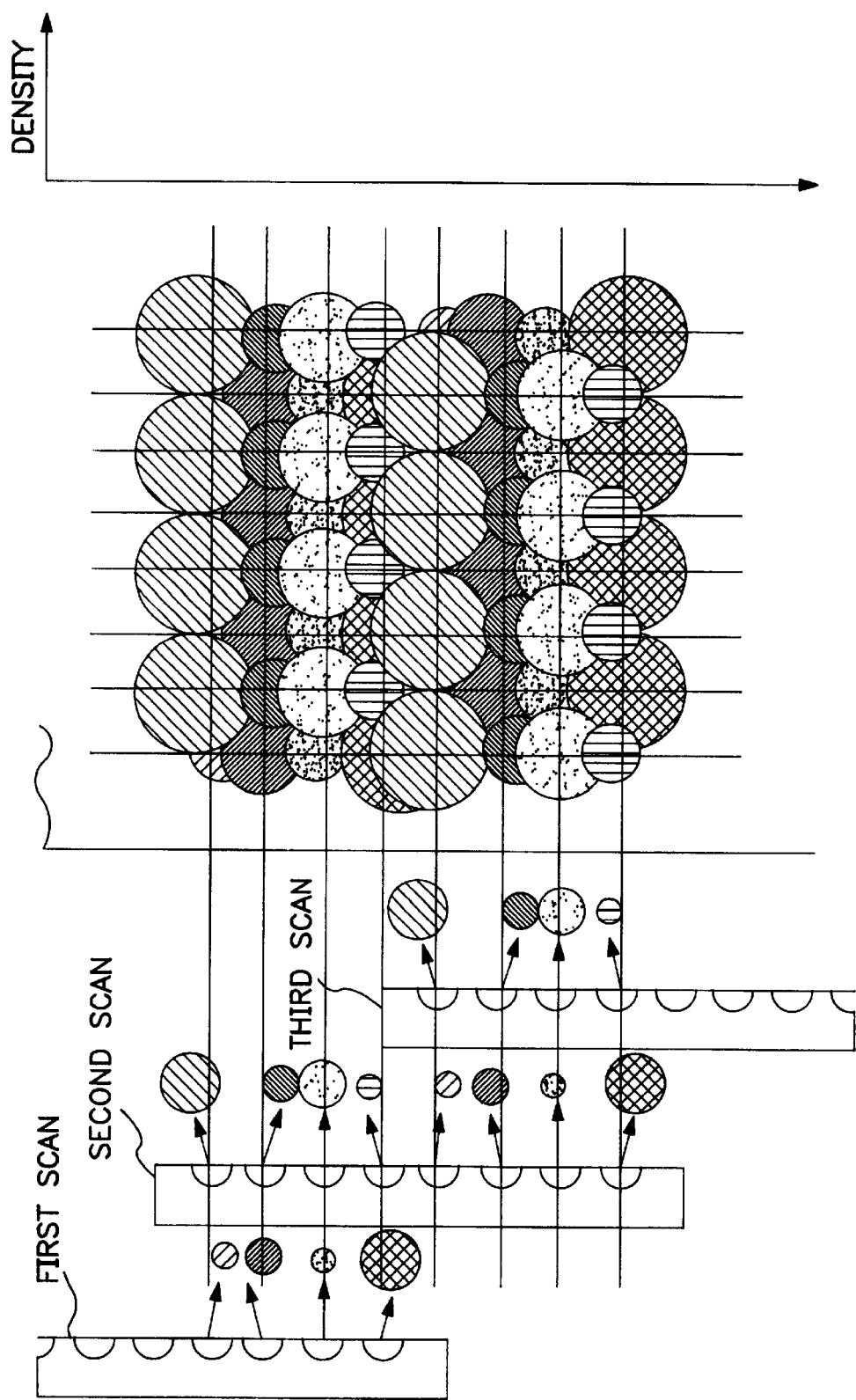
FIG. 10 is an example of a print model of two-scan multipath printing.
Figure 11:
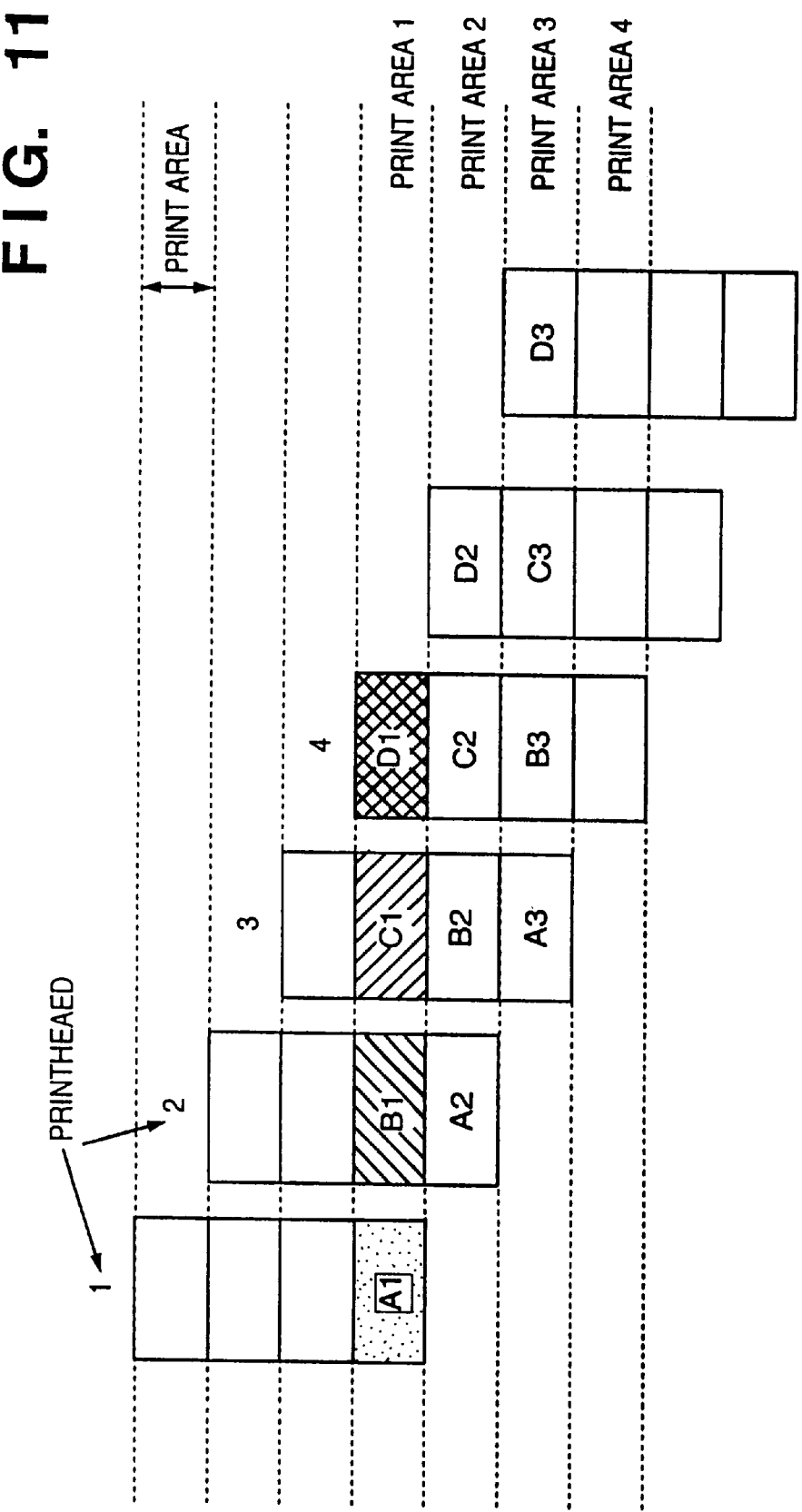
FIG. 11 is an explanatory view showing print areas, a printhead and mask patterns of four-path printing.
Figure 12:
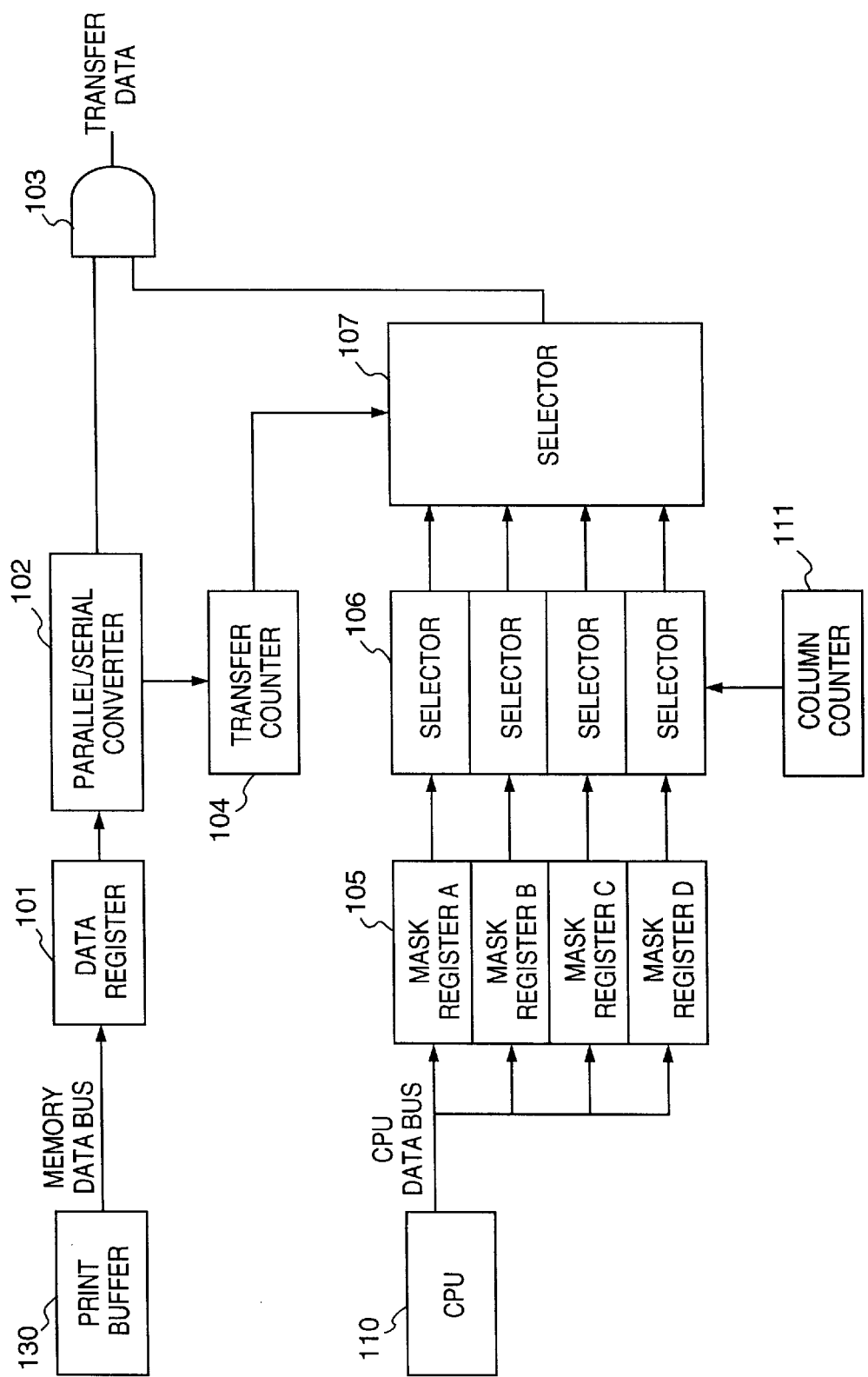
FIG. 12 is a block diagram showing the construction of a conventional data transfer circuit.

The operation and display unit of the facsimile apparatus has been described with reference to FIG. 2, however, the present invention is not limited to this layout. For example, an operation and display unit having a layout as shown in FIG. 8 which allows manual setting of print mode may be employed. In FIG. 8, the key switches and lamps corresponding to those in FIG. 2 have the same reference numerals.

In FIG. 8, numeral 205 denotes a MULTIPATH key for instructing the multipath print mode selection and designating the number of scannings; 205a to 205c, LED's respectively for indicating selected two-scannings, four-scannings and eight-scannings of the multipath printing. When the normal print mode is selected, the LED's 205a to 205c are all turned off. The selection of the number of scannings is made by pressing the MULTIPATH key 205 in a cyclic manner.

In the operation and display unit having the above construction, the priority of manual setting of print mode and the number of scannings and priority of automatic setting may be arbitrarily determined. It may be arranged so that current printing status is indicated by the LED's 205a to 205c regardless of manipulation of the MULTIPATH key 205.

In FIG. 8, the hardware key switches are used, however, instead of the key switches, icons and/selection menu may be displayed on an LCD provided at the operation and display unit for user's selection.

As described above, in the facsimile apparatus having the printer unit which performs printing by scanning a printhead plural times in a direction vertical to a direction in which a print medium such as a print sheet is conveyed, the control of selecting normal print mode to perform printing in one print area by one scanning or multipath print mode to perform printing in one print area by a plurality of scannings has been described. If the multipath print mode is selected, the print controller receives a print command in which a multipath flag (MPF) is set from the main controller, and multipath printing is performed under the control of the print controller 8.

Accordingly, the feature of the present invention is how to select the multipath printing on what condition(s) in an actual apparatus having a printer unit, and the invention does not relate to the method of the multipath printing.

In the above embodiments, the selection of the multipath/normal print mode is performed by the main controller, and the actual printing is performed under the control of the print controller, however, the present invention is not limited to this arrangement, but the print mode selection and print control may be performed by one CPU.

Further, in the above embodiments, the print execution unit in case of multipath printing is not specifically described. The unit of printing may be the end of each scanning or the end of each page.

Furthermore, in the above embodiments, the facsimile apparatus which can operates as a copying apparatus, a printer and a facsimile apparatus, however, the present invention is not limited to this type of facsimile apparatus, but it can be applied to any printing apparatus such as a printer or a copying apparatus as far as it can set various printing modes.

The embodiment described above have exemplified a printer, which comprises means (e.g., an electrothermal transducer, laser beam generator and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

The present invention can be applied to a system constituted by a plurality of devices or to an apparatus comprising a single device. Furthermore, the invention is also applicable to a case where the invention is embodied by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing by scanning a printhead a plural number of times over a print area of a print medium, in a direction perpendicular to a conveyance direction of the print medium, comprising:

input means for inputting image data;
judgment means for judging the type of the image data;
selection means for selecting a first print mode for performing printing by scanning said printhead the plural number of times over the print area of the print medium, or selecting a second print mode for performing printing by scanning said printhead once over the print area, in accordance with the result of judgment by said judgment means; and
print means for performing printing using said printhead in one of the first print mode and second print mode selected by said selection means,
wherein said judgment means Judges whether the type of the image data is a text or image type, or said judgment means judges whether the type of the image data is a binary image type or a halftone image type.

2. The printing apparatus according to claim 1, wherein said input means includes interface means for inputting image data from an external device connected to said printing apparatus.

3. The printing apparatus according to claim 1, wherein said input means includes reading means for reading an original image.

4. The printing apparatus according to claim 3, further comprising instruction means for instructing a reading resolution and the type of the image data.

5. The printing apparatus according to claim 4, wherein said judgment means further judges the reading resolution.

6. The printing apparatus according to claim 1, further comprising print control means for changing the plural number of times of scanning said printhead, in accordance with the result of judgment by said judgment means, if said selection means selects the first print mode.

7. The printing apparatus according to claim 1, wherein said printhead is an ink-jet printhead for discharging ink in accordance with an ink-jet printing method.

8. The printing apparatus according to claim 1, wherein said judgment means includes area discrimination means for discriminating an area in the image corresponding to one page of the print medium as a binary image area or a halftone image area, and
wherein said selection means selects the first or second print mode in accordance with result of discrimination by said area discrimination means.

9. The printing apparatus according to claim 8, further comprising print control means for changing the plural number of times of scanning said printhead, in accordance with the result of discrimination by said area discrimination means.

10. The printing apparatus according to clam 1, further comprising manual instruction means for manually instructing the first or second print mode and the number of times of scanning said printhead in the first print mode.

11. A facsimile apparatus employing the printing apparatus according to claim 1, as a printing unit, comprising:

communication means for performing facsimile communication with a communication destination apparatus via a communication line;
coding and decoding means for encoding image data and decoding coded data received via the communication line;
interpretation means for interpreting as to whether or not a printing unit in said communication destination apparatus has a function for printing in the first print mode; and transmission control means for instructing said communication destination apparatus to perform printing by the printing unit in said communication destination apparatus in the first print mode in accordance with result of interpretation by said interpretation means and a result of judgment by said judgement means, and for transmitting image data to said communication destination apparatus, wherein print control in the printing unit is performed in accordance with the result of interpretation by said interpretation means.

12. The facsimile apparatus according to claim 11, wherein said interpretation means diagnoses the functions of said communication destination apparatus, based on an identification signal of facsimile communication initially received via said communication line.

13. The facsimile apparatus according to claim 11, wherein said transmission control means further instructs the number of times of scanning a printhead of the printing unit in said communication destination apparatus.

14. The facsimile apparatus according to claim 11, further comprising monitor means for monitoring decoding period necessary for decoding the received coded data, wherein selection of the first print mode or the second print mode is switched in accordance with the decoding period.

15. The facsimile apparatus according to claim 14, wherein the plural number of times of scanning said printhead in the first print mode is changed in accordance with the decoding period.

16. The facsimile apparatus according to claim 11, further comprising count means for counting a number of changes of white pixels to black pixels or black pixels to white pixels, in the image data decoded by said coding and decoding means, wherein the selection of the first print mode or the second print mode is switched in accordance with a count value counted by said count means.

17. The facsimile apparatus according to claim 16, wherein the plural number of times of scanning said printhead in the first print mode is changed in accordance with the count value counted by said count means.

18. The facsimile apparatus according to claim 11, wherein said judgment means includes area discrimination means for discriminating an area in the image data corresponding to one page of the print medium as a binary image area or a halftone image area, and wherein said selection means selects the first or second print mode in accordance with result of discrimination by said area discrimination means.

19. An image processing apparatus including printing means for performing multipath printing by repetitively scanning a printhead over a print area of a print medium, comprising:

input means for inputting image data;

image processing means for processing the image data inputted by said input means;

judgment means for judging the type of the image data;

selection means for selecting a first print mode for performing printing by scanning said printhead a plural number of times over the print area of the print medium, or selecting a second print mode for performing printing by scanning said printhead once over the print area, in accordance with the result of judgment by said judgment means; and print control means for performing printing using said printhead in one of the first print mode and second print mode selected by said selection means, wherein said ludgement means judges whether the type of the image data is a text type or image type, or said judgment means judges whether the type of the image data is a binary image type or a halftone image type.

20. The image processing apparatus according to claim 19, wherein said input means includes interface means for inputting image data from an external device connected to said printing apparatus.

21. The image processing apparatus according to claim 19, wherein said input means includes reading means for reading an original image.

22. The image processing apparatus according to claim 21, further comprising instruction means for instructing a reading resolution and the type of the image data.

23. The image processing apparatus according to claim 19, wherein said input means includes communication means for receiving facsimile image data from a communication destination apparatus via a communication line.

24. The image processing apparatus according to claim 23, further comprising interpretation means for interpreting as to whether or not a printing unit of said communication destination apparatus has a function for printing in the first print mode, wherein said print control means controls said printing means to perform printing in the first print mode, in accordance with result of interpretation by said interpretation means and a result of judgment by said judgment means.

25. The image processing apparatus according to claim 23, wherein said communication means includes decoding means for decoding the received facsimile image data.

26. The image processing apparatus according to claim 25, further comprising monitor means for monitoring decoding period necessary for decoding the received facsimile image data by said decoding means, wherein said print control means switches selection of the first print mode or the second print mode by said selection means, in accordance with the decoding period.

27. The image processing apparatus according to claim 26, wherein said print control means changes the plural number of times of scanning said printhead in the first print mode in accordance with the decoding period.

28. The image processing apparatus according to claim 25, further comprising count means for counting a number of changes of white pixels to black pixels or black pixels to white pixels, in the image data decoded by said decoding means, wherein said print control means switches selection of the first print mode or the second print mode by said selection means, in accordance with a count value counted by said count means.

29. The image processing apparatus according to claim 28, wherein said print control means changes the plural number of times of scanning said printhead in the first print mode in accordance with the count value counted by said count means.

30. The image processing apparatus according to claim 22, wherein said judgment means judges the reading resolution.

31. The image processing apparatus according to claim 19, wherein said print control means changes the plural number of times of scanning said printhead, in accordance with the result of judgment by said judgment means, if said selection means selects the first print mode.

32. The image processing apparatus according to claim 19, wherein said printhead is an ink-jet printhead for discharging ink in accordance with an ink-jet printing method.

33. The image processing apparatus according to claim 19, wherein said judgment means includes area discrimination means for discriminating an area in the image corresponding to one page of the print medium as a binary image area or a halftone image area, and wherein said selection means selects the first or second print mode in accordance with result of discrimination by said area discrimination means.

34. The image processing apparatus according to claim 33, wherein said print control means changes the plural number of times of scanning said printhead, in accordance with the result of discrimination by said area discrimination means.

35. The image processing apparatus according to clam 19, further comprising manual instruction means for manually instructing the first or second print mode and the number of times of scanning said printhead in the first print mode.

* * * * *

UNITED STATES PATENT AND TRADEMARK OFFICE
CERTIFICATE OF CORRECTION

PATENT NO. : 5,943,068
DATED : August 24, 1999
INVENTOR(S) : Teruyuki Nishii, et al.

It is certified that error appears in the above-identified patent and that said Letters Patent is hereby corrected as shown below:

COVER PAGE

```
Please insert the following:
--[30] Foreign Application Priority Data

Mar. 3, 1995   [JP]   Japan .............7-044024--.

Under [56] References Cited, U.S. Patent Documents, insert
--5,457,347    11/1994    Hirose et al.
  5,359,355    11/1994    Nagoshi et al.
  5,552,894     9/1996    Aiba--.
```

COLUMN 14

```
Line 11, "Judges" should read --judges--.
```

COLUMN 16

```
Line 6, "ludgement" should read --judgment--.
```

Signed and Sealed this

Sixth Day of June, 2000

Attest:

Q. TODD DICKINSON

*Attesting Officer*     *Director of Patents and Trademarks*